United States Patent
Schulz (10) Patent No.: US 7,092,001 B2
(45) Date of Patent: Aug. 15, 2006

(54) VIDEO CONFERENCING SYSTEM WITH PHYSICAL CUES

(75) Inventor: Karsten Schulz, Middle Park (AU)

(73) Assignee: SAP Aktiengesellschaft, Walldorf (DE)

( * ) Notice: Subject to any disclaimer, the term of this patent is extended or adjusted under 35 U.S.C. 154(b) by 180 days.

(21) Appl. No.: 10/721,503

(22) Filed: Nov. 26, 2003

(65) Prior Publication Data

US 2005/0110867 A1 May 26, 2005

(51) Int. Cl.
H04N 7/14 (2006.01)

(52) U.S. Cl. .............................. 348/14.05; 348/14.01; 709/204

(58) Field of Classification Search .. 348/14.01–14.16; 345/473, 629, 660, 667; 700/13; 715/733, 715/753; 705/2; 709/204
See application file for complete search history.

(56) References Cited

U.S. PATENT DOCUMENTS

| | | | | |
|---|---|---|---|---|
| 5,347,306 A | * | 9/1994 | Nitta | 348/14.1 |
| 6,292,713 B1 | * | 9/2001 | Jouppi et al. | 700/245 |
| 6,384,829 B1 | * | 5/2002 | Prevost et al. | 345/473 |
| 6,394,402 B1 | * | 5/2002 | Coonan et al. | 248/123.11 |

FOREIGN PATENT DOCUMENTS

| | | | |
|---|---|---|---|
| GB | 2 128 842 A | | 5/1984 |
| JP | 04 284790 A | | 10/1992 |
| JP | 2002046088 A | * | 2/2002 |
| WO | WO 9851078 A1 | * | 11/1998 |
| WO | WO 02/42909 A | | 5/2002 |

OTHER PUBLICATIONS

Paulos et al, "Social Tele-Embodiment: Understanding Presence", copyright 2001, pp. 87-95, Autonomous Robots 11.*
Pavlovic, Vladimir I., "Visual Interpretation of Hand Gestures for Human-Computer Interaction: A Review," *IEEE Transactions on Pattern Analysis and Machine Intelligence*, vol. 19, No. 7, Jul. 1997, pp. 677-695, XP000698168.

* cited by examiner

Primary Examiner—Stella Woo
(74) Attorney, Agent, or Firm—Fish & Richardson P.C.

(57) ABSTRACT

A video-conferencing system is described that provides physical cues regarding remote participants. Each remote participant is physically represented at a video conference by a robotic unit that includes a monitor, camera, microphone and speaker. In this way, a physical presence of the remote participant is conveyed at the conference, so that other participants are more likely to involve the remote participant. Moreover, the remote participant has access to a gesture determination system, which inputs gesture information about the remote participant that expresses a state of mind of the participant. Such gesture information may include leaning forward to show interest, or leaning back to show disinterest. The gesture information is transmitted to the robotic unit, which is actuated so as to reflect the gesture information, and thereby express the state of mind of the remote participant in a physical, intuitive way.

21 Claims, 12 Drawing Sheets

VIDEO CONFERENCING SYSTEM WITH PHYSICAL CUES

TECHNICAL FIELD

This description is related to video conferencing systems.

BACKGROUND

Conventional video conferencing systems exist that allow people to communicate with each other over large distances. Such video conferencing systems often provide both a visual representation (video) and an audible representation (audio) of each of the conference participants, plus a set of communication tools, such as, for example, a whiteboard or shared computer application.

For example, each of the conference participants (or groups of participants) may be located at a plurality of locations. At each of the locations, a camera and associated microphone may capture audio-video information for transmission to each of the other locations. Additionally, each location may have a video screen and associated speaker(s) for outputting audio-video information received from the other locations. In this way, all of the participants may see and hear the other participants, substantially in real-time.

In the field of robotics, robots and other mechanical devices exist that are capable of reflecting movements of a user at a distance, for the purpose of performing a function or task. That is, a user movement at a first location is tracked, and the movement is reflected (e.g., mirrored) by a robot at a remote location. For example, systems exist that allow a surgeon to perform a procedure at a distance, with a remote-controlled robot performing physical actions on a patient while the surgeon controls the movements of the robot while viewing its actions using a camera.

SUMMARY

According to one general aspect, a system includes an audio-visual input system at a first location that is operable to receive audio-visual information associated with a user, a gesture determination system at the first location that is operable to determine gesture information associated with a state of mind of the user, and a tele-embodiment unit at a second location that is operable to receive the gesture information and engage in movement corresponding to the gesture information, whereby the movement of the tele-embodiment unit expresses the state of mind of the user.

Implementations may have one or more of the following features. For example, the second location may be a site of a conference, and the tele-embodiment unit may convey a physical presence of the user.

An audio-visual output system may be included at the second location that is operable to output the audio-visual information associated with the user. The tele-embodiment unit may include a robotic arm associated with a monitor and camera. In this case, the tele-embodiment unit may be operable to move the monitor and camera in alignment with one another.

The gesture determination system may include a gesture control device by which the user inputs the gesture information. In this case, the gesture information may include selectable emotional states and the movement of the tele-embodiment unit may be pre-programmed to correspond to a selected emotional state.

The gesture determination system may include a gesture control device that is operable to track physical movements of the user. In this case, the gesture determination system may include a gesture interpreter for associating the physical movements with the state of mind of the user.

According to another general aspect, audio-visual input is received from a conference participant, expression information associated with a non-verbal communication of the conference participant is determined, the audio-visual input and the expression information is transmitted to a conference location, the audio-visual input is rendered at an audio-visual output associated with a tele-embodiment unit at the conference location, and the tele-embodiment unit is moved, based on the expression information, to reflect the non-verbal communication of the conference participant.

Implementations may have one or more of the following features. For example, in determining expression information, a selection of expression information may be received from among a pre-selected list available to the conference participant.

Also in determining expression information, physical movements of the conference participant may be tracked, and a software algorithm may be run to determine the non-verbal communication, based on the physical movements.

In moving the tele-embodiment unit, a video screen that is attached to a robot arm may be moved so as to be pivotable and movable in three dimensions. The tele-embodiment unit may have a one-to-one correspondence with the conference participant, such that a physical presence of the conference participant is conveyed at the conference location.

According to another general aspect, a video-conferencing system includes a plurality of participant input systems corresponding to a plurality of participants, each input system operable to receive audio-visual input from its corresponding participant, and a plurality of physical conference units located at a conference location that is remote from a location of each of the participant input systems, each of the physical conference units corresponding to one of the plurality of participants and including audio-visual output capabilities, wherein the physical conference units convey a physical presence of their corresponding participants at the conference location.

Implementations may have one or more of the following features. For example, each participant input system may include a gesture determination system operable to receive gesture information associated with a state of mind of its corresponding participant, and a remote communication handler operable to forward the gesture information and the audio-visual input to its corresponding physical conference unit.

In this case, the gesture determination system may include a gesture control device operable to track physical movements of its corresponding participant, and a gesture interpreter operable to associate the physical movements with the state of mind.

Each physical conference unit may include a robotic unit operable to move in coordination with the gesture information, such that the physical conference unit physically expresses the state of mind of its corresponding participant. In this case, the robotic unit may include a video screen aligned with a camera and attached to a robot arm that is operable to move the video screen and camera in conjunction with the gesture information and the audio-visual input. Further in this case, the robot arm may be operable to move the video screen and camera in three dimensions.

The details of one or more implementations are set forth in the accompanying drawings and the description below.

Other features will be apparent from the description and drawings, and from the claims.

DETAILED DESCRIPTION

Figure 1:
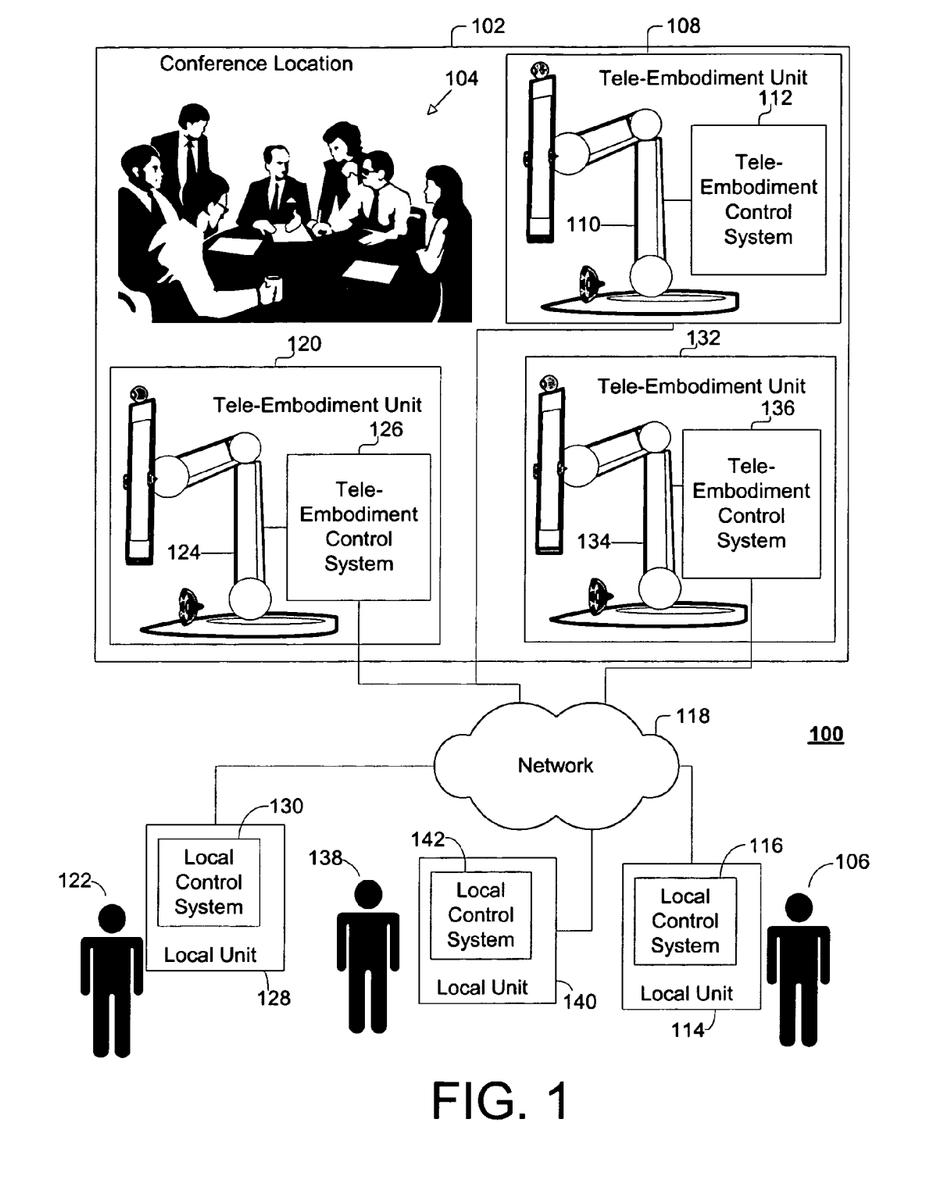
FIG. 1 is a block diagram of a video conferencing system with physical cues.

FIG. 1 is a block diagram of a video conferencing system 100 with physical cues. In FIG. 1, a conference location 102 is the site of a conference 104 involving various participants. In such a conference, as referred to above, it is often the case that remote participants may be involved via some type of audio-visual system.

In FIG. 1, specifically, a remote participant 106 is represented at the conference 104 by a tele-embodiment unit 108 that is at the conference location 102. The tele-embodiment unit 108 includes a robotic unit 110 that is operated by a tele-embodiment control system 112. As discussed in more detail below, the robotic unit 110 includes various audio-visual systems for capturing information from the conference 104, and for displaying information about the remote participant 106 to the other participants of the conference 104 at the conference location 102.

In FIG. 1, information about the remote participant 106 is collected at a local unit 114 that is local to the remote participant 106, and that is controlled by a local control system 116. For example, the local control system 116 may operate a camera and a microphone associated with the local unit 114 to collect audio-visual information about the remote participant 106, and then transmit this information to the tele-embodiment unit 108 via a network 118. The network 118 may include, for example, the Public Switched Telephone Network (PSTN), the Internet, or an enterprise-wide Intranet.

The tele-embodiment unit 108 serves to convey a physical presence of the remote participant 106 to the participants of the conference 104. That is, the generally one-to-one correspondence between the tele-embodiment unit 108 and the remote participant 106 serves as a reminder to participants at the conference location 102 that the remote participant 106 is also participating in the conference. As a result, the participants will generally take more notice of the remote participant 106 than if a single monitor were used to display all remote participants, who may or may not be locally present with the remote participant 106.

In this way, the participants at the conference location 102 may be more likely to refer to, converse with, or consult the remote participant 106 on a particular point. For example, a participant at the conference location 102 may see the tele-embodiment unit 108 representing the remote participant 106 (e.g., including a face of the remote participant 106 displayed on a video screen associated with the robotic unit 110), and may recall that the remote participant 106 has a particular area of expertise that is relevant to a current topic of conversation. As another example, the participants at the conference location 102 may be more likely to involve the remote participant 106 when taking a vote on a particular point of order.

The physical presence conveyed by the tele-embodiment unit 108 may be similarly implemented by a tele-embodiment unit 120 representing a remote participant 122. As shown in FIG. 1, the tele-embodiment unit 120 is associated with its own robotic unit 124 and tele-embodiment control system 126, while the remote participant 122 is associated with a local unit 128 and local control system 130. Yet another tele-embodiment unit 132, including a robotic unit 134 and tele-embodiment control system 136, may be used at the conference location 102 to represent a remote participant 138, by way of a local unit 140 and associated local control system 142.

It should be understood that the remote participants 106, 122, and 138 may be located at three different locations, or at a single location. At the location(s) of the remote participants 106, 122, and 138, there may be tele-embodiment units representing the participants at the conference location 102.

That is, the participants at the conference location 102 may make use of their own local units, so that their physical presence may be conveyed to the remote participants 106, 122, and 138. In one example, there may only be one conference participant who is actually physically present at a given one of a plurality of locations, where each location may have tele-embodiment units for all other participants. In this way, all participants have their physical presence conveyed to all other participants.

As discussed above, there is an advantage simply in conveying such physical presence information during a conference. For example, a speaker at the conference location 102 may look around the room and be reminded that there are, for example, nine other participants, even though only six may actually be at the conference location 102. Moreover, as mentioned above, when the tele-embodiment units 108, 120, and 132 include monitors for displaying visual information, the speaker would actually be able to look at the individual faces of the remote participants 106, 122, and 138 while speaking.

In particular, it should be understood that the tele-embodiment units 108, 120, and 132 may be placed around a conference table at positions that would be occupied by the remote participants 106, 122, and 138 if they were actually present at the conference location 102. Even beyond a mere physical presence of the remote participants 106, 122, and 138, however, the robotic units 110, 124, and 134 may be used as vehicles for conveying additional information between and about the various local and remote conference participants.

Specifically, as discussed in more detail below, the robotic units 110, 124, and 134 may be manipulated to as to express communication information, such as, for example, an emotional state of their respective remote participants 106, 122, 138, in a physical way. As also described below, such information may be captured at the local units 114, 128, and 140, and transmitted to the respective tele-embodiment units 108, 120, and 132 using the network 118. In these ways, the tele-embodiment units 108, 120, and 132 provide video-conferencing that includes physical cues with respect to all remote participants.

Figure 2:
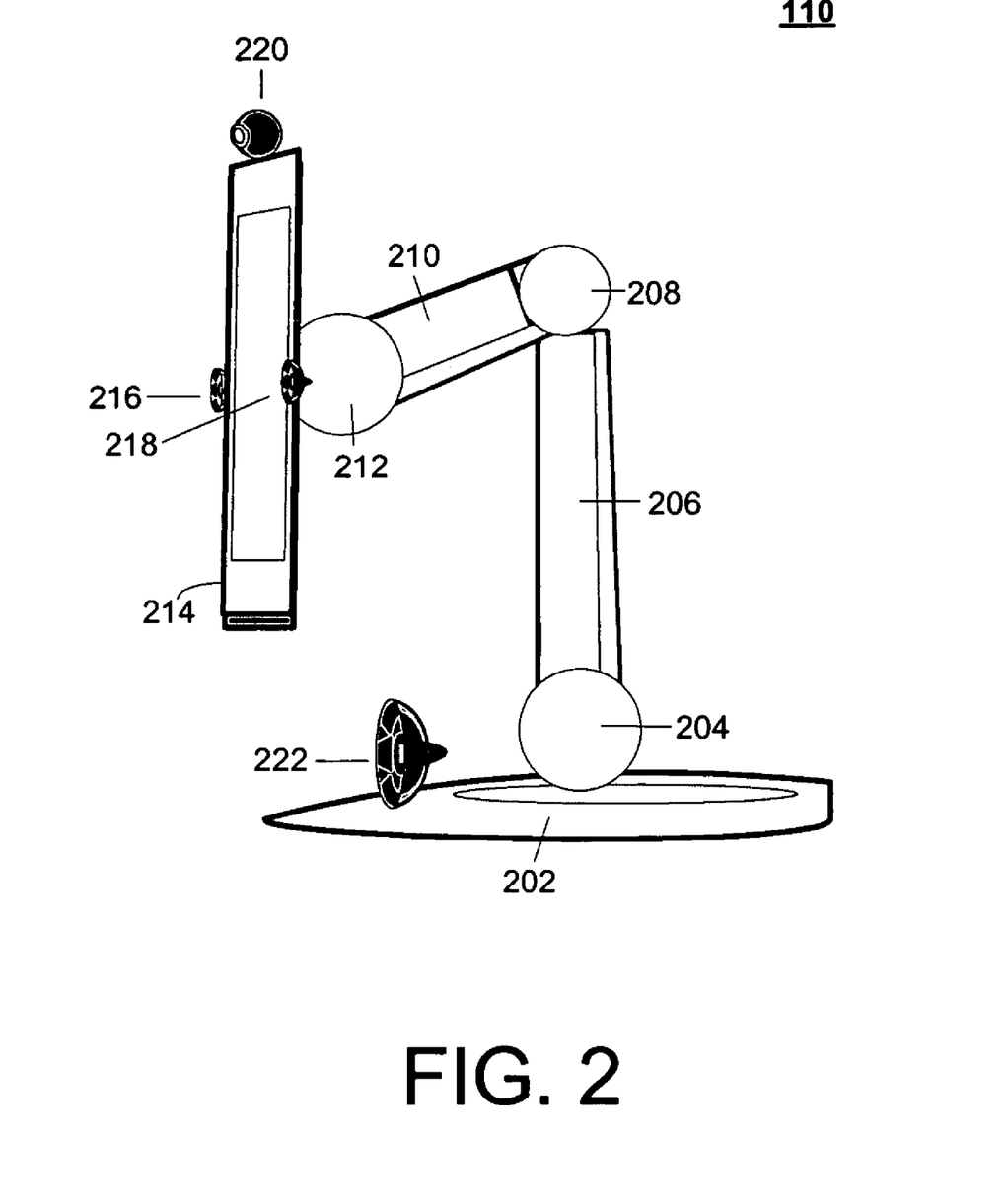
FIG. 2 is an illustration of a robotic unit for use in the video conferencing system of FIG. 1.

FIG. 2 is an illustration of a robotic unit for use in the video conferencing system of FIG. 1. Specifically, FIG. 2 illustrates the robotic unit 110 of the tele-embodiment unit 108. In FIG. 2, the robotic unit 110 is positioned on a base 202. The base 202 may serve as a convenient tool for easily and reliably positioning the robotic unit 110 about, for example, a conference room table.

A first joint 204 connects the base 202 to a first arm 206. On a pair of axes defined by the first arm 206 when perpendicular to a surface upon which the base 202 rests, the first joint 204 allows motion of the first arm 206, including rotating (swivel) motion, about and/or along either axis.

A second joint 208 connects the first arm 206 to a second arm 210. The second joint 208 allows motion of the first arm 206 and/or the second arm 210, including rotating motion, around and along an axis parallel to the surface upon which the base 202 rests.

A third joint 212 connects the second arm 210 to a screen 214. The third joint 212 allows motion of the screen 214 (in conjunction with the first arm 206 and the second arm 210) about and along the pair of axes defined above. Additionally, the third joint 212 allows motion of the screen about and along an axis that is perpendicular to both of these axes (i.e., an axis leading out of the paper in FIG. 2).

Also in FIG. 2, a first microphone 216 and a second microphone 218 are connected to the screen 214 for collecting audio information from the conference. Similarly, a camera 220 is connected to the screen 214, and a speaker 222 is attached to the base 202.

The robotic unit 110 thus conveys not only a physical presence of its associated remote participant 106 at a conference, it also serves to otherwise facilitate communication between all (local and remote) conference participants. For example, since the camera 220 is aligned with the screen 214, a viewing field of a remote participant is aligned with an appearance of the remote participant's face, much as a person's eyes generally move along with a direction of the person's head.

As a result, the remote participant 106 may turn the robotic unit 110 as needed, for example, to look in a direction of a new speaker (actuation of the robotic unit 110 using the local unit 114 is discussed in more detail below). Similarly, the microphones 216 and 218 are locally positioned at the screen 214, and move with the screen 214, so that the remote participant 106 may actuate the robotic unit 110 to turn to a participant to the immediate right or left of the robotic unit 110 at the conference location 102 (which may be one of the other robotic units 124 or 136). In this way, the remote participant 106 may have a semi-private conversation with this other participant, in much the same way that might occur if the remote participant 106 were physically present at the conference location 102.

Based on the above, the video conferencing system 100 of FIG. 1 can be understood to convey a physical presence or representation of remote participants, and to facilitate communication between all participants, individually and as a whole. In particular, the system 100 provides information about where remote participants are "looking," as well as facial expressions of the remote participants that might not be available if a single camera were being used at the remote location for a plurality of participants.

Such facial expressions may be important to communications of the participants. That is, such non-verbal communication, including, for example, a look of surprise or approval/disapproval, a shaking or nodding of the head, or various other facial expressions, may be very important to conducting full communication between participants.

There are various other types of non-verbal communication. For example, there is an audible type, which includes the volume, modulation, and pitch of the voice. Another type of non-verbal communication is generally referred to as body language, or gestures. Such gestures generally refer to motions of the body that are made (often unconsciously) to express or illustrate thought, to emphasize what is being said at a particular time, and/or to react to what has been said by another participant. As such, this type of non-verbal communication may be thought of as an expression of a state of mind of a person at a particular point in time.

This type of non-verbal communication may be difficult to convey in conventional systems. For example, in a conventional video conferencing system, a single camera may be trained on multiple individuals, or may be focused on an individual from such a distance that it is difficult for remote viewers to see physical motions of the individuals. In other cases, the camera may not be focused on an individual at all at a particular time (for example, in systems where a camera automatically focuses on a person talking), in which case such physical information is completely lost to non-local participants.

Examples of frequently-used gestures, each of which may have a significant influence of the perception that a person conveys, include: leaning forward when interested; leaning backward when not interested or un-decided about the matter; nodding to encourage the speaker or to request further information; tilting one's head if in doubt; or, as a final example, shaking one's head to show disagreement. Such gestures express a person's interest in the matter discussed, and can be conveyed non-intrusively in the context of others speaking (e.g., do not require interruption of a speaker to indicate agreement).

The robotic unit 110 of the tele-embodiment unit 108 is capable of displaying such physical gesture information. Specifically, the robotic unit 110 is capable of moving in a way that reflects and demonstrates a gesture of the remote participant 106, whereby a state of mind of the remote participant 106 is non-verbally expressed to participants at the conference location 102 in an intuitive, non-intrusive, convenient fashion.

Figure 3:
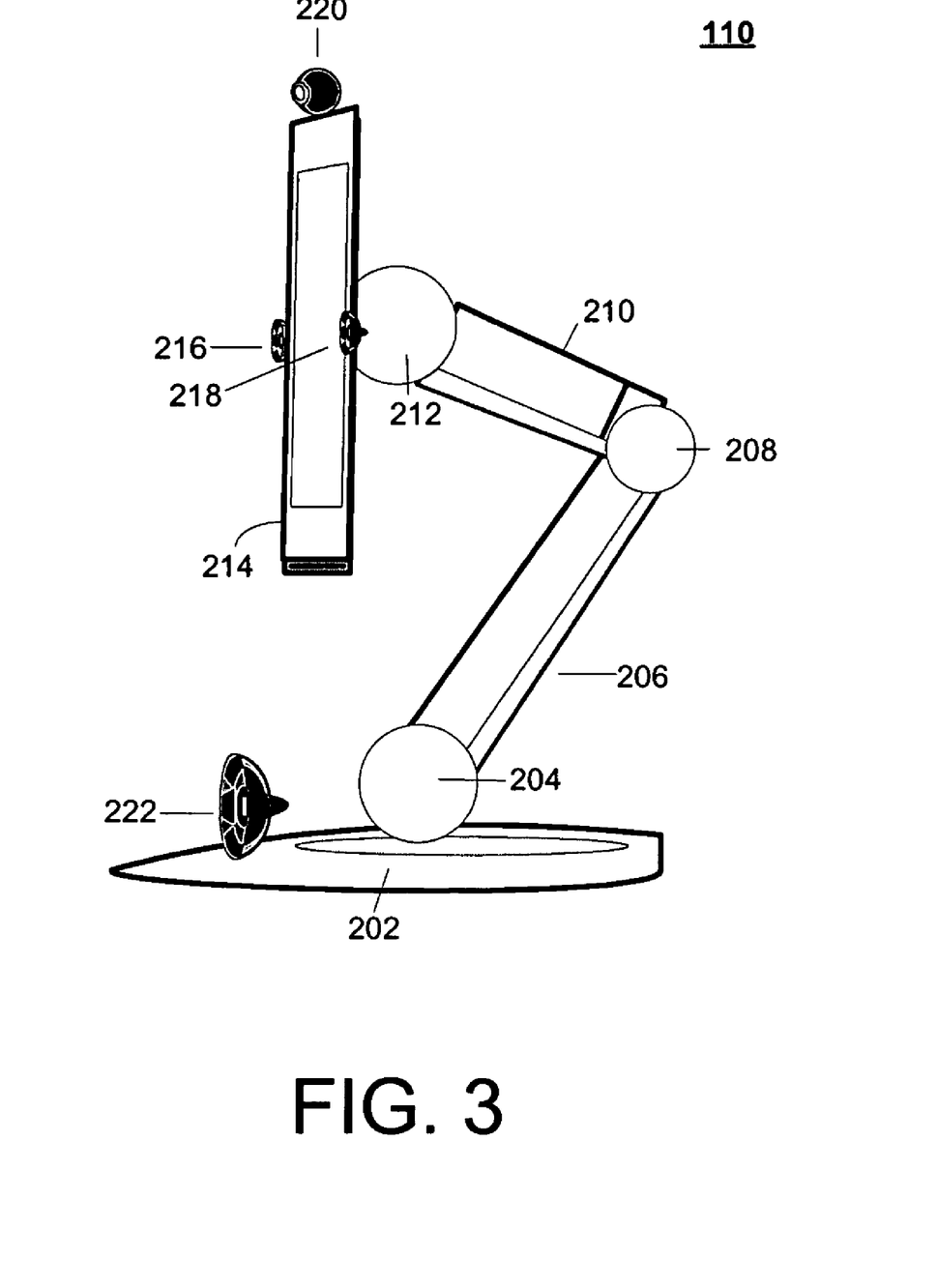
FIG. 3 is an illustration of the robotic unit of FIG. 2 reflecting a neutral expression.

FIG. 3 is an illustration of the robotic unit 110 of FIG. 2 reflecting a neutral expression. In FIG. 3, the robotic unit 110 is neither leaning forward nor back, or otherwise expressing gesture information for conveying non-verbal communication.

Figure 4:
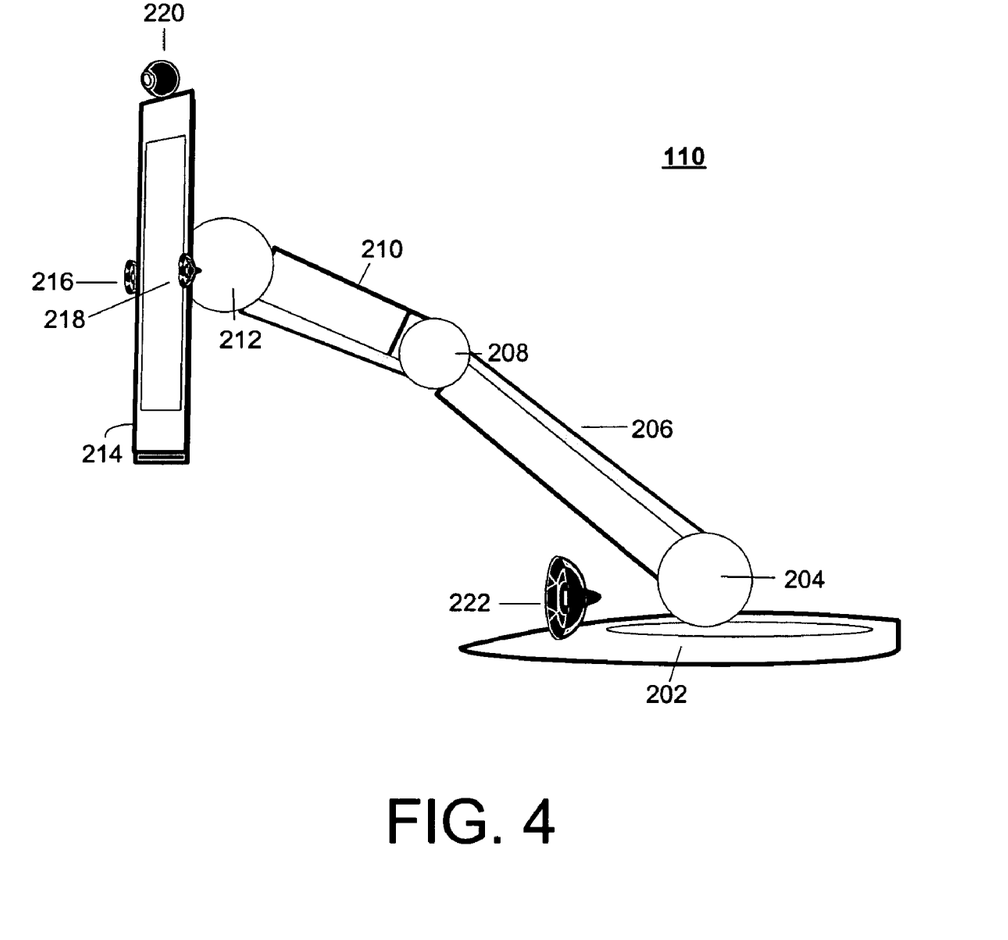
FIG. 4 is an illustration of the robotic unit of FIG. 2 reflecting a expression of strong interest.

FIG. 4, in contrast, is an illustration of the robotic unit 110 of FIG. 2 reflecting a expression of strong interest. That is, the arms 206 and 210 of the robotic unit 110 are moved at the joints 204, 208, and 212 so that the robotic unit 110, particularly including the screen 214, are leaning forward. Such a position mimics the behavior of a conference participant who is very interested in what is currently being said, and may be an indication, for example, that the remote participant 106 is likely to contribute to the conversation when feasible (i.e., when the current speaker pauses in talking).

Figure 5:
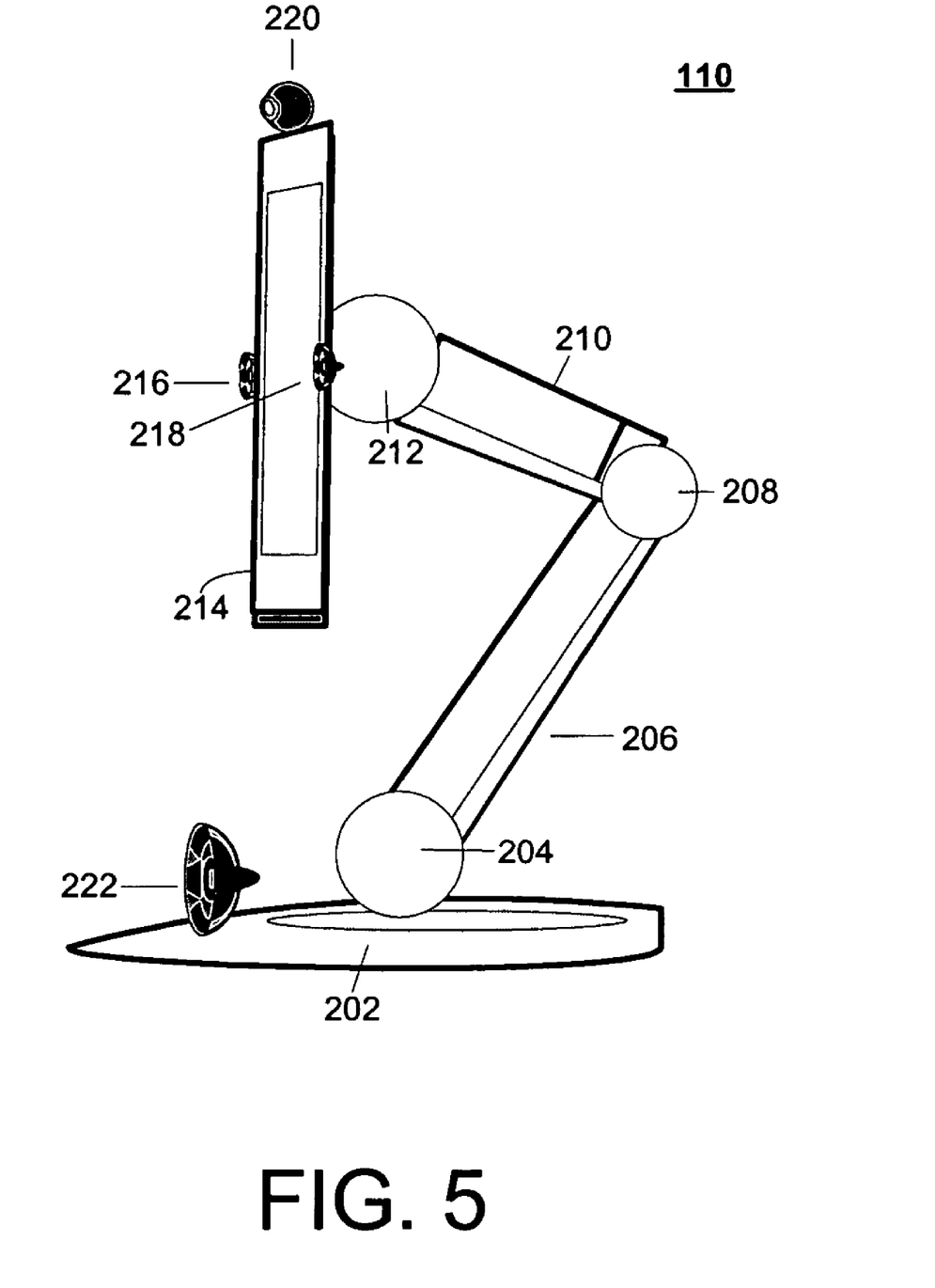
FIG. 5 is an illustration of the robotic unit of FIG. 2 reflecting an undecided expression.

FIG. 5 is an illustration of the robotic unit 110 of FIG. 2 reflecting an undecided expression. Such a gesture may be expressed, for example, when the remote participant has doubts about what is being said. For example, this expression may be used when the remote participant is doubtful that an earnings goal will be reached, or that a project is feasible in its currently-discussed form.

Figure 6:
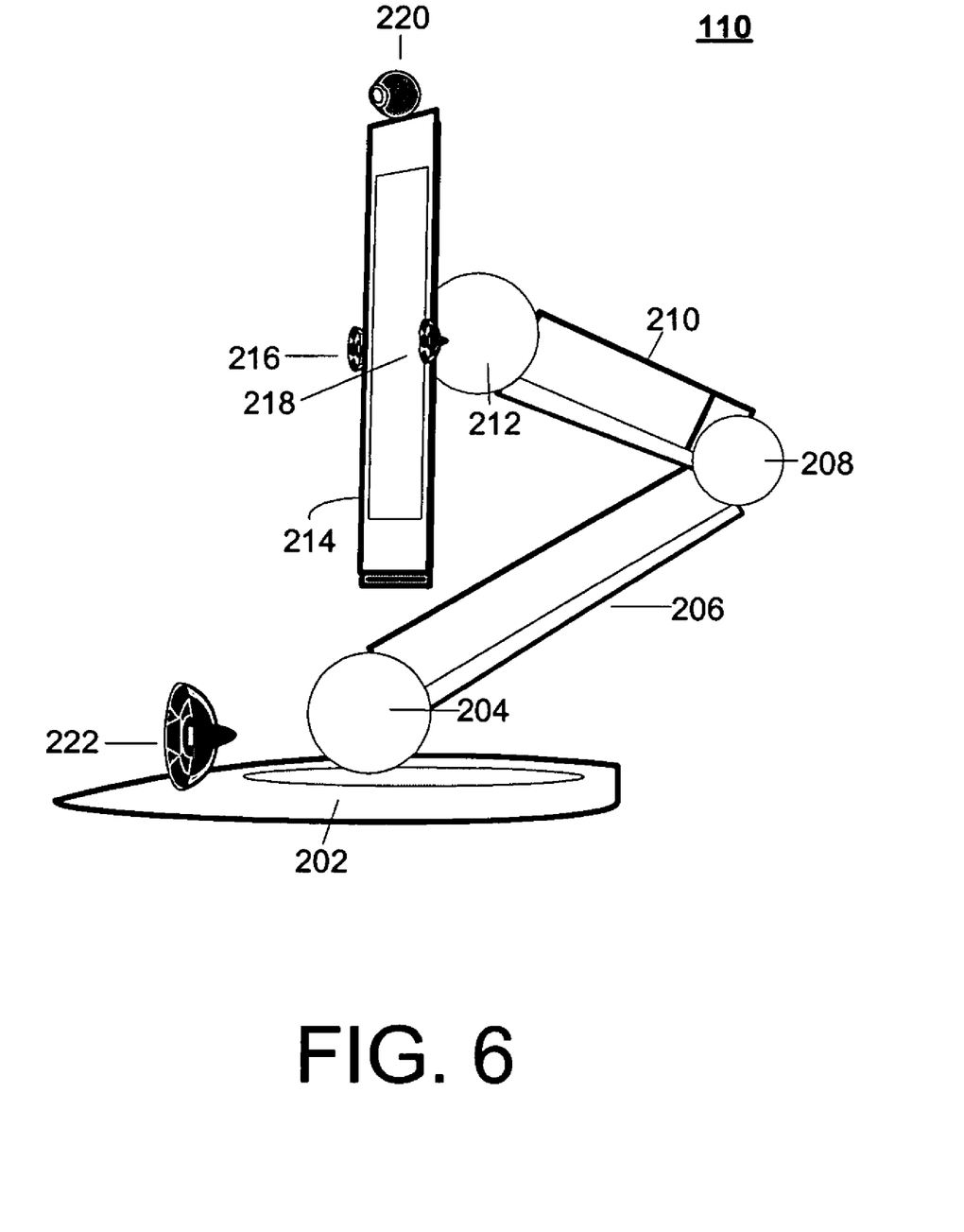
FIG. 6 is an illustration of the robotic unit of FIG. 2 reflecting an expression of depressed reservation.

FIG. 6 is an illustration of the robotic unit 110 of FIG. 2 reflecting an expression of depressed reservation. This expression mimics a tendency to, for example, slump one's shoulders or otherwise slouch when depressed. This motion is reflected in the lowering of the screen 214 toward the base 202, and a slight movement of the screen 214 away from the conversation (i.e., toward the second joint 208 in FIG. 6).

Figure 7:
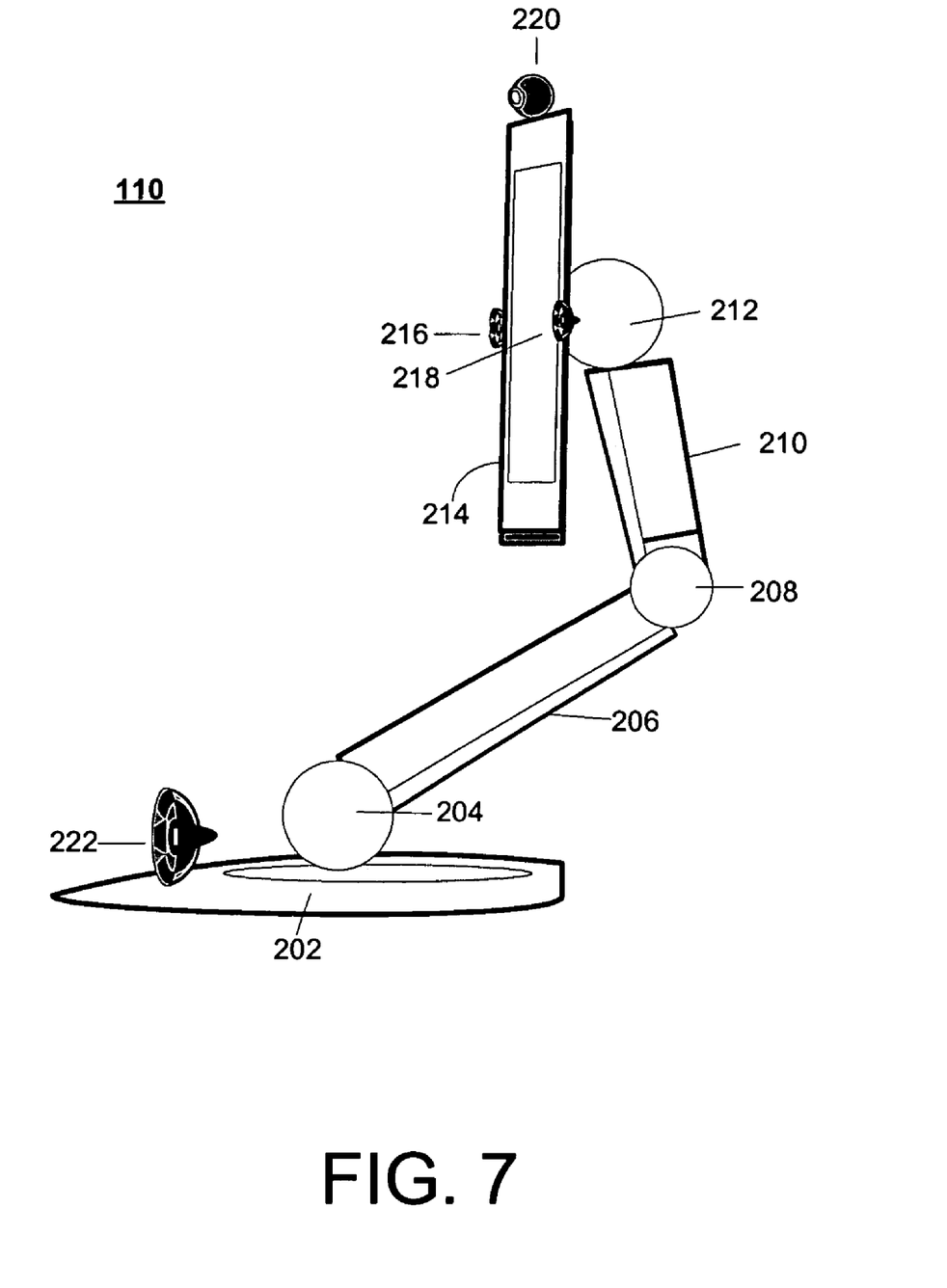
FIG. 7 is an illustration of the robotic unit of FIG. 2 reflecting an expression of angry reservation.

FIG. 7 is an illustration of the robotic unit 110 of FIG. 2 reflecting an expression of angry reservation. This expression mimics a tendency of a person to indignantly or angrily withdraw from a conversation. This motion is reflected in the extreme movement of the screen 214 away from the conversation, and a possible raising of the screen in a vertical direction away from the base 202.

Although several examples are given above with reference to FIGS. 3–7, it should be apparent that many more emotions, expressions, and states of mind may be expressed using the robotic unit 110. For example, the screen 214 may be made to "nod" agreement by rotating in a vertical direction about the third joint 212, or, similarly, may shake side-to-side to indicate disagreement. Particularly when considering that a facial expression of the remote participant 106 will be shown on the screen 214, the various positions and movements of the robotic unit may be utilized to express users' states of mind in a convenient, intuitive, and non-intrusive manner.

Figure 8:
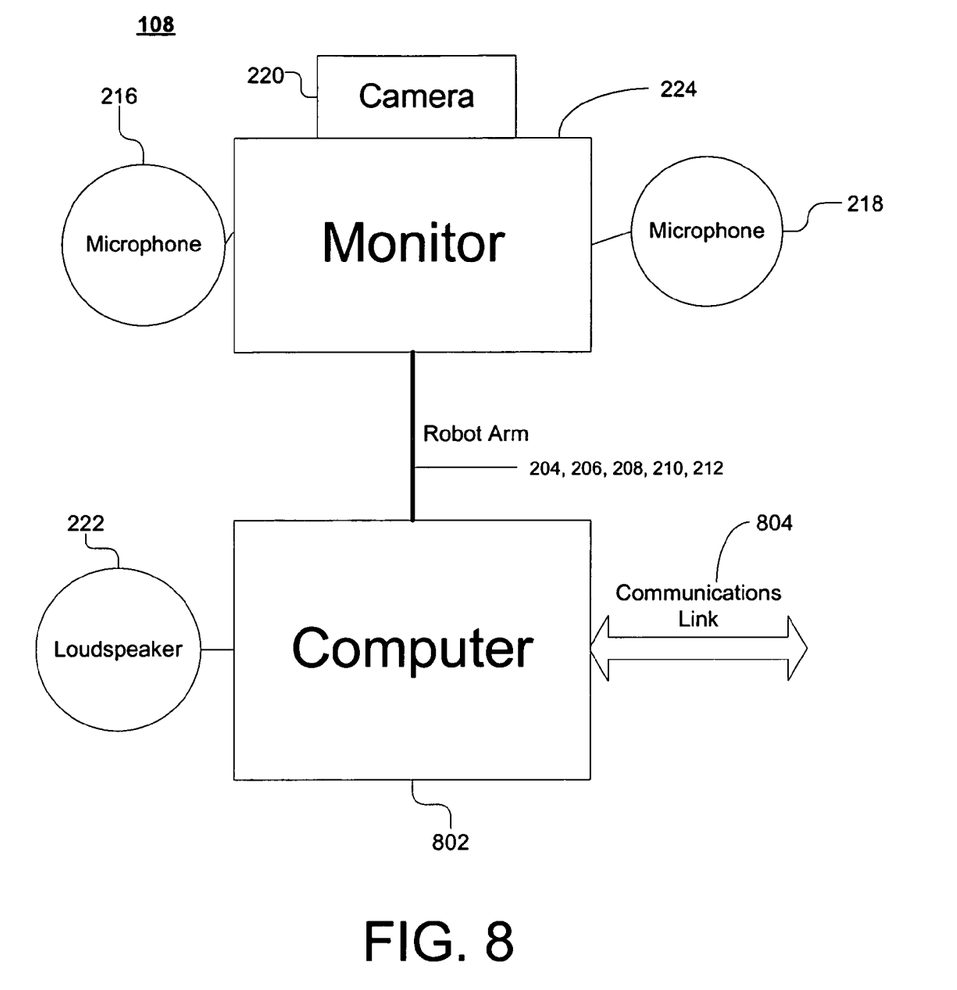
FIG. 8 is a block diagram of the tele-embodiment units of FIG. 1.

FIG. 8 is a block diagram of the tele-embodiment unit 108 of FIG. 1. FIG. 8 illustrates that the various features of the tele-embodiment unit 108 may be controlled and operated by a computer 802 that is used to implement the tele-embodiment control system 112.

Specifically, the computer 802 receives communications, using a communications link 804, from the local control system 116 via the network 118. The communications are then implemented to achieve the various effects described above.

The computer 802 may be wholly or partially integrated with the robotic unit 110 (for example, in the base 202). In another implementation, a single one of the computer 802 may be connected to, and used to, operate all three (or more) of the tele-embodiment units 108, 120, and 132.

Operation of the tele-embodiment unit 108 may thus be implemented by an appropriate selection of software, hardware, or any combination thereof. For example, such software may generally include a memory for storing instructions to be implemented by one or more of a processor (including a Digital Signal Processor (DSP)), a field-programmable gate array (FPGA), an application-specific integrated circuit (ASIC), other programmable logic or gate arrays, or programmable logic with a processor core.

Figure 9:
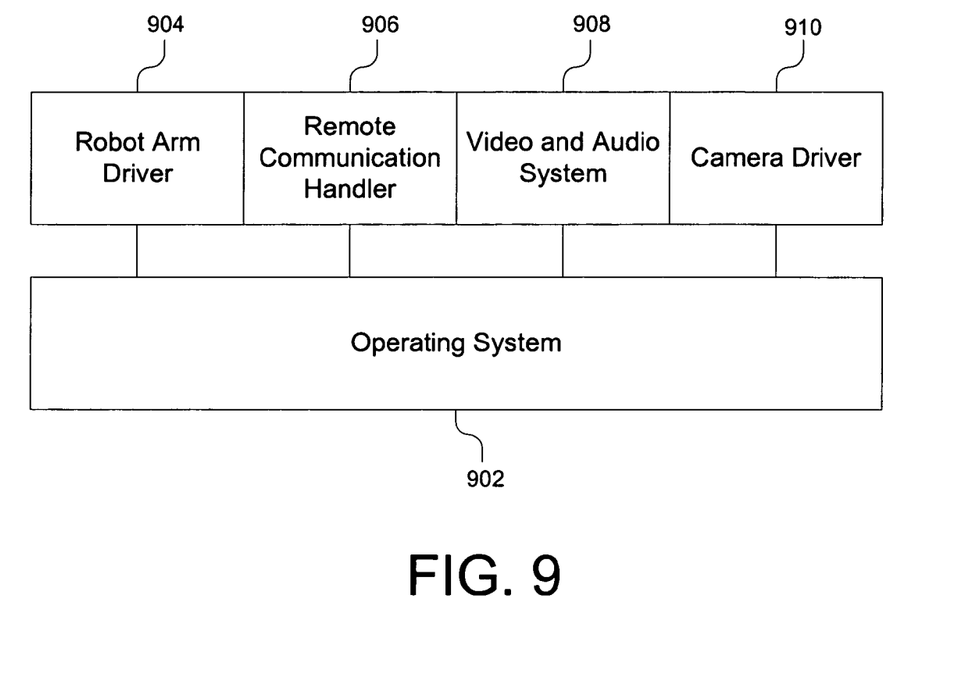
FIG. 9 is a block diagram representing software functionality of the tele-embodiment unit of FIG. 8.

FIG. 9 is a block diagram representing software functionality of the tele-embodiment unit of FIG. 8. Specifically, FIG. 9 illustrates software modules interacting with an operating system 902, which together comprise the tele-embodiment control system 112.

In FIG. 9, a robot arm driver 904 is operable to convey commands to the robot arm(s) 206, 210, so that the robotic unit 110 moves in, for example, the various manners outlined above. Additionally, the robot arm driver 904 conveys commands to the robot arm 206, 210, and detects or otherwise obtains information about a current position and/or status of the robot arm 206, 210.

For example, if the robotic unit 110 is inadvertently bumped by a conference participant, it may become moved from its desired or configured position. The robot arm driver 904 may be instrumental in determining an actual versus a desired position of the robotic unit 110, so that any discrepancies may be eliminated. As discussed in more detail below, the robot arm driver 904, during typical operation, may be in communication with the local unit 114.

A remote communication handler 906 is a general component that exchanges communication data over the network 118 with the local unit 114 regarding, for example, control of the robot arm and the zoom or focus of the camera 220. This network communication may be conducted using standard internet protocols, such as, for example, Transmission Control Protocol/Internet Protocol (TCP/IP) or User Datagram Protocol (UDP). Additionally, higher level protocols may be used, such as, for example, Hyper-Text Transfer Protocol (HTTP(s)), Simple Object Access Protocol (SOAP), and Extensible Mark-up Language (XML). The remote communication handler 906 may thus conduct bi-directional communication with its counterpart in the local unit 114.

A video and audio system 906 conveys local audio and audio to the tele-embodiment unit 108, and plays audio and video from the local unit 114 (received via the remote communication handler 906) on the tele-embodiment unit 108. For example, the video and audio system 906 mediates information to/from the screen 214, the microphones 216, 218, the camera 220, and the speaker 222.

Finally in FIG. 9, a camera driver 910 performs various functions related to the camera 220. For example, the camera driver 910 may be used to transform zoom or focus commands from the remote participant 106 to the camera 220.

Figure 10:
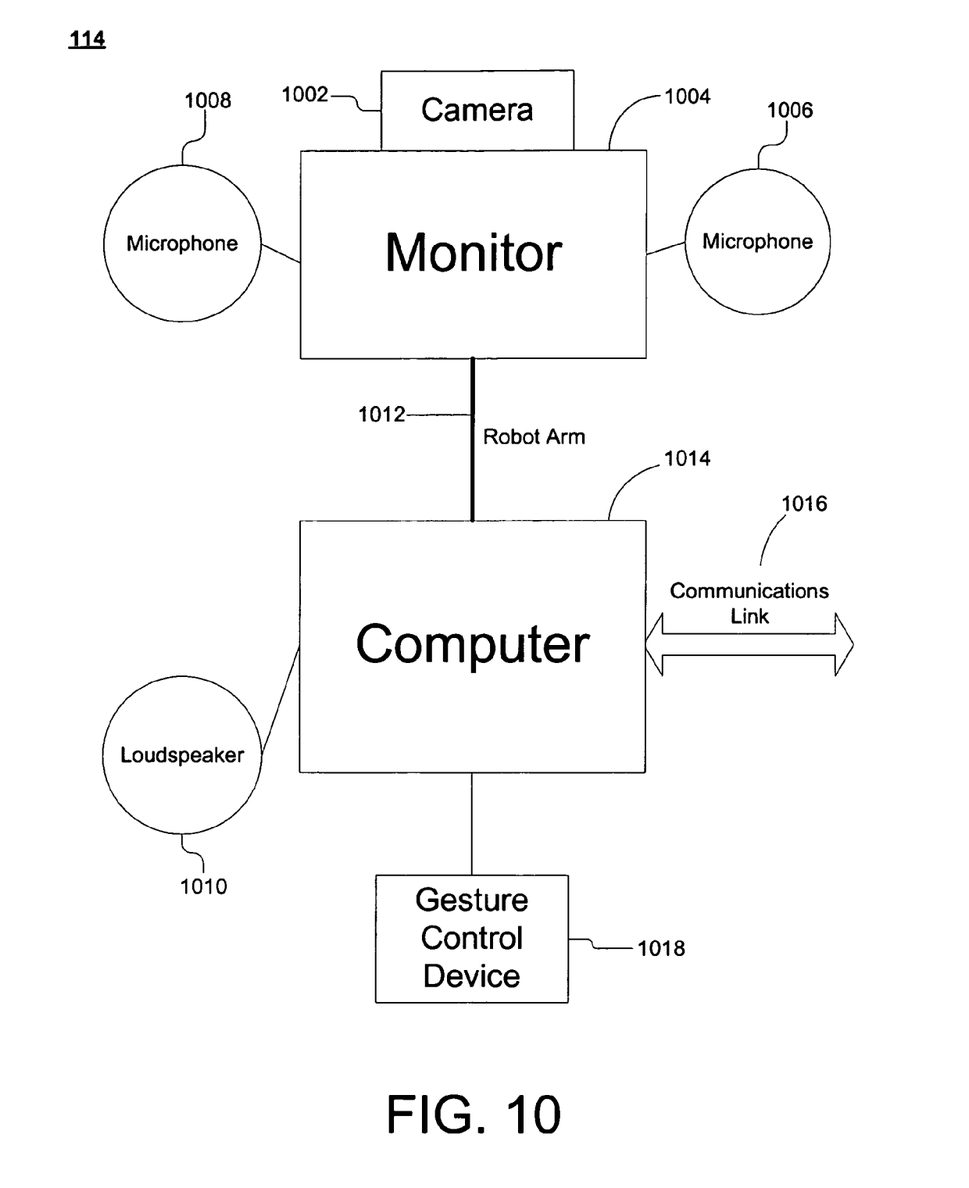
FIG. 10 is a block diagram of the local units of FIG. 1.

FIG. 10 is a block diagram of the local unit 114 of FIG. 1. In FIG. 10, the local unit 114 is shown to comprise many of the same elements as the tele-embodiment unit 108 of FIG. 1. Specifically, the local unit 114 includes a camera 1002, a monitor 1004, a microphone 1006, another microphone 1008, and a speaker 1010. Further, the local unit 114 includes a robot arm 1012, a computer 1014, and a communications link 1016 for communicating with the tele-embodiment unit 108 via the network 118. In addition, the local unit 114 also includes a gesture control device 1018, which is described in more detail below, for determining a gesture of the remote participant 106 for expression thereof by the tele-embodiment unit 108, as described above.

Thus, in FIG. 10, it should be understood that the local unit 114 may essentially include, or have access to, its own tele-embodiment unit, having all of the various features and advantages of the tele-embodiment unit 108. For example, in a scenario where only two participants are conferencing, a first participant may be seated at a table at a first location facing a tele-embodiment unit conveying a physical presence of the second participant. In this case, the tele-embodiment unit is capable of providing all of the functionality of the local unit 114, providing the gesture control device is present. Meanwhile, the second participant may be seated at a table at a second location facing a tele-embodiment unit conveying a physical presence of the first participant, which, again, may serve as a local unit for the second participant.

This model may be extended to any number "N" of participants, each at a different location. In this case, each participant may be seated with N−1 tele-embodiment units representing the other N−1 participants. In this way, all participants have the benefit of, for example, conveyed physical presence and gesture information for all other participants. In this case, the elements of FIG. 10 other than the gesture control device 1018 may represent N−1 of those elements. For example, there may be N−1 monitors, since each monitor would be showing the face of one of the other participants. However, only one gesture control device 1018 would generally be necessary to determine gesture data from the participant who is actually present.

In other implementations, the local unit need not include all of the functionality of the tele-embodiment unit. For example, in FIG. 1, it may be the case that the remote participant 106 is the only participant at a particular location, and that location may not be equipped with full tele-embodiment unit(s) including robotic unit(s). Instead, the location may only have a stationary camera, monitor, microphone, and speaker, along with the gesture control device 1018. In this example, then, the participants at the conference location 102 would have the benefit of the conveyed physical presence of the remote participant 106, even though the remote participant 106 would not have the reciprocal benefit.

The gesture control device 1018 may take any one or more of a plurality of forms. In one example, the gesture control device 1018 may represent a joystick(s) that the remote participant 106 may manipulate to indicate an emotional state (for example, pressing forward to indicate interest in the current topic). Similarly, the gesture control device 1018 may represent a keypad or switchboard with a plurality of labeled states (e.g., "interested," "doubtful," or "angry") that the remote participant 106 may select by pressing a corresponding button. Of course, similar implementations may be implemented in software, by, for example, implementing a user interface that allows the remote participant 106 to select an emotional state using a mouse, keyboard, or other input device.

In other implementations, the gesture control device 1018 may not require explicit input from the remote participant 106. For example, the gesture control device 1018 may be associated with software running on the computer 1014 and operable to infer an emotional state of the remote participant 106 using a variety of techniques.

In one such implementation, the gesture control device 1018 may be embedded in a chair (or a portion of the chair) of the remote participant 106, so as to detect body motion. In another implementation, motion detectors may be used in conjunction with the camera 1002, monitor 1004, microphones 1006/1008, speaker 1010, and/or computer 1014 (or with the gesture control device 1018 itself, or generally positioned within, for example, a room at the location of the remote participant 106) so as to detect any motions of the remote participant 106.

In yet another implementation, sensors may be included in items that are easily attachable to the person of the remote participant 106. For example, sensors may be included in gloves, chest straps, headphones, or other wearable items that the remote participant 106 may easily don and remove. Such sensors may be integrated with other components of the local unit 114; for example, sensors may be integrated with the microphone 1008 that is attached to a lapel, pocket, or necktie of the remote participant 106.

In another implementation, software may be implemented on the computer 1014 that operates in conjunction with the other components of the local unit 114. For example, the camera 1002 may be used to implement facial-recognition software that examines a facial expression of the remote participant 106 and implements a corresponding software algorithm to determine an emotional state of the remote participant 106 that is to be reflected as a gesture using the tele-embodiment unit 108. Similarly, the microphones 1006, 1008 may be used to gather voice data of the remote participant 106, so that software on the computer 1014 may analyze voice characteristics, such as, for example, modulation, pitch, speaking speed (or change thereof), or volume in determining an emotional state of the remote participant 106.

In the above-described implementations, software is used to gather and interpret data regarding an emotional state and/or physical position of the remote participant 106. Of course, any combination of the above-described implementations, or various other implementations, also may be used to determine an emotional state of the remote participant 106, so that this information may be represented in a physical way as a movement (gesture) of the robotic unit 110.

One aspect of the local unit 114 is that it also generally enables the remote participant 106 to remotely control the robotic unit 110 for the purposes of conventional video-conferencing functionality. Examples of such functionality include zooming/focusing of the camera 220, pointing direction of the camera 220, or a volume or direction of the microphones 216, 218 and/or speaker 222.

In FIG. 10, these and other functions may be implemented in whole or in part using the gesture control device 1018. For example, in implementations where the gesture control device 1018 includes a joystick or switchboard for entering emotional states, the same device may be used for aiming the camera 220. In other implementations (for example, where gesture recognition (i.e., functionality of the gesture control device 1018) is performed entirely by facial and/or voice recognition software), separate devices may be used to implement control of the robotic unit 110 and associated devices.

It should be understood that the functionality of gesture collection/control and device control may overlap. For example, the monitor 214 of the robotic unit 110 may be turned to the side to obtain a particular viewing angle, or as part of a side-to-side indication of disapproval (corresponding to a disapproving head shake).

Figure 11:
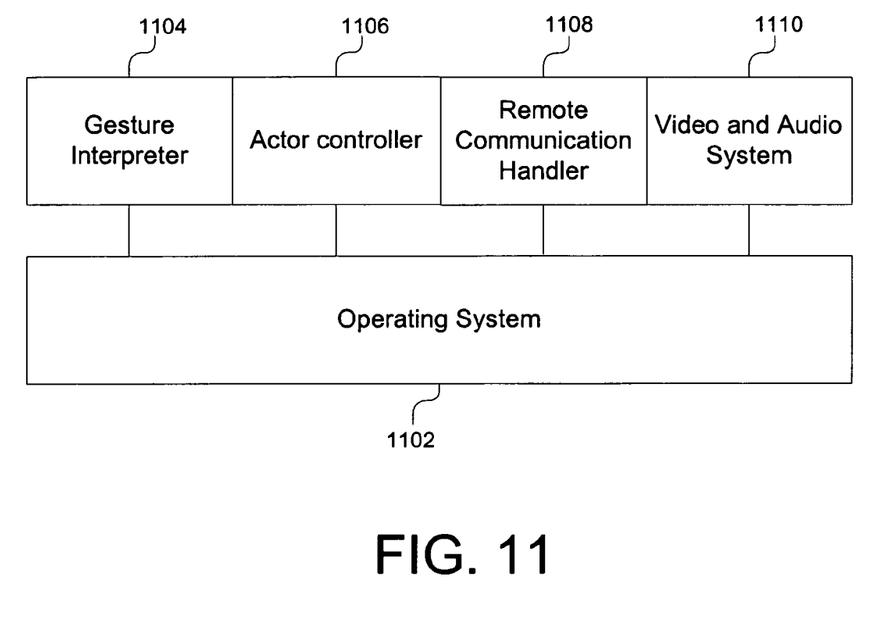
FIG. 11 is a block diagram representing software functionality of the local unit of FIG. 10.

FIG. 11 is a block diagram representing software functionality of the local unit of FIG. 10. In FIG. 11, an operating system 1102 runs on the computer 1014. A gesture interpreter 1104 receives data from the gesture control device 1018 regarding physical movements and/or an emotional state of the remote participant 106, and determines a corresponding motion of the tele-embodiment unit 108 (robotic unit 110) that is to be implemented.

An actor controller module 1106 is used in controlling the robotic unit 110. Specifically, the actor controller module 1106 is used as part of a feedback loop in which the tele-embodiment unit 108 communicates settings of the robotic unit 110 to the actor controller module 1106, such that the actor controller can, if necessary, re-adjust the robot arm.

For example, the actor controller module 1106 may be used to implement the above-described functionality of positioning the camera 220 (or, in cases where the gesture control device 1018 is used for this functionality, the actor controller module 1106 may have information from the gesture interpreter 1104 as to a position of the camera 220). In some cases, the actor controller may notice a discrepancy between the supposed position of the robotic unit 110 and an actual position reported by the robot arm driver 904. For example, as referred to above, such a situation may occur where the robotic unit has incidentally been bumped by a conference participant at the conference location 102. In these cases, the actor controller module 1106 may be used to re-orient the robotic unit 110 (or other component) to its desired position.

Finally in FIG. 11, a remote communication handler 1108 communicates with the remote communication handler 906 of FIG. 9, and operates in a manner similar to the remote communication handler 906 as described above. A video and audio system 1110 collects and outputs audio and video information about the remote participant 106 using the corresponding devices (camera 1002, microphones 1006/1008, monitor 1004, and speaker 1010) described above.

Figure 12:
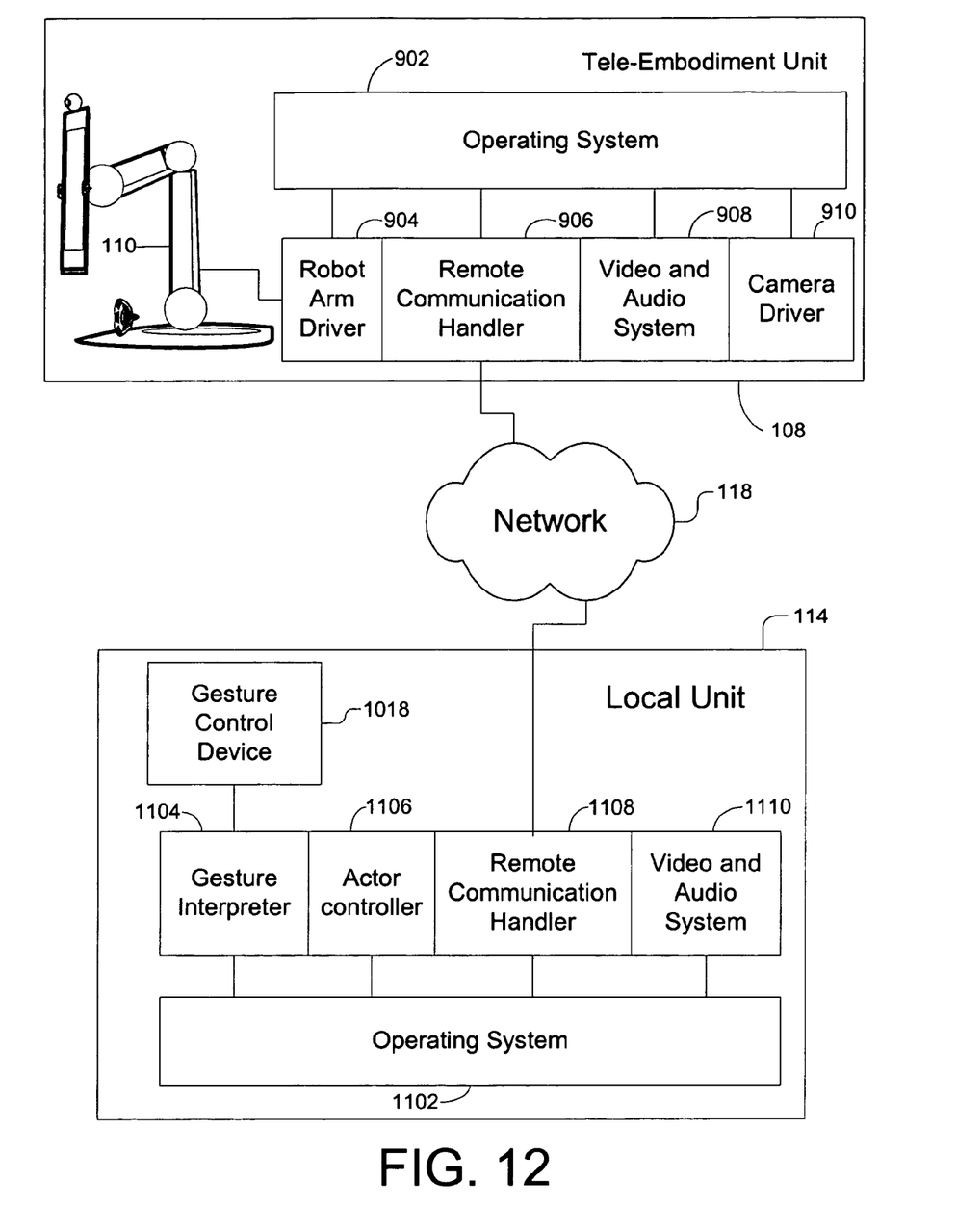
FIG. 12 is a block diagram of the video-conferencing system of FIG. 1 illustrating the specific units and functionality illustrated in FIGS. 8–11.

FIG. 12 is a block diagram of the video-conferencing system of FIG. 1 illustrating the specific units and functionality illustrated in FIGS. 8–11. More specifically, FIG. 12 illustrates one example of the interaction between the software and hardware components of the implementations described above.

In FIG. 12, then, video, audio, and gesture data are collected by the video and audio system 1110 and the gesture control device 1018. Note that the various audio/video hardware components of the local unit 114 are generally not illustrated in FIG. 12; however, it should be understood from the above discussion that such components may include a unit similar to the robotic unit 110, or may include conventional audio-video conferencing components, or any combination thereof.

The gesture interpreter 1104 determines gesture information based on the input from the gesture control device 1018, and operating parameters for the robotic unit 110 (e.g., camera zoom) are inputted from the gesture control device 1018 and/or from other hardware components, using the actor controller module 1106. All of the gesture information, audio/video information, and operating parameters are transmitted using the remote communication handler 1108 to its counterpart remote communication handler 906, over the network 118.

At the tele-embodiment unit 108, this information is disseminated to the robot arm driver 904, the camera driver 910, and the video and audio system 908, so as to operate the robotic unit 110 and associated components. Conversely, audio/video information and positioning/operational information are collected or determined based on an operation of the robotic unit 110, and returned to the local unit 114 using the remote communication handler 906.

In this way, and as generally described above, video conferencing may be conducted in a manner that conveys a physical presence of remote participants. Moreover, an emotional state of the remote participants, as well as other non-verbal communication cues and body language, may be represented and conveyed in a physical, intuitive way.

Additionally, it should be understood that the above advantages may be obtained easily and inexpensively. That is, implementations described above do not generally require complicated or expensive components to operate. For example, the robotic unit 110 described above may be easily built and operated. The robotic unit 110 forms a discrete component that is easily moved from location to location (e.g., conference room to conference room), as needed. Similarly, the robotic unit 110 may be easily arranged within a particular room or other setting; for example, on a conference table or on a centrally-located podium.

Since the robotic unit 110 is controlled by software, multiple robotic units may be controlled by a single computer running multiple instances of the tele-embodiment control system 112. Alternatively, a computer (e.g., processor and memory) may be embedded in the robotic unit(s).

Moreover, although the above implementations have generally been described in terms of video-conferences, it should be understood that other implementations also may be used. For example, an illusion of physical presence of a remote person may be obtained even when the remote person is not currently interacting with the apparatus through the local unit(s). For example, the robotic unit 110 may carry through a set of randomly chosen or pre-programmed movements. Such an implementation or similar implementations may be useful, for example, when a person and his or her tele-embodiment unit are located in different time zones.

As another example, some implementations may be used in a classroom or other learning environment, or at any event where an audience may attend. In this way, participants at these events may be more involved in the proceedings.

Additionally, although the above implementations have been described in terms of the robotic unit 110, it should be understood that other robotic units may be used. For example, the robotic unit may be used with more or fewer arms and joints than illustrated herein. The robotic unit 110 may have additional features not explicitly described herein, such as an arm that may be raised separately from the screen 214, so as to, for example, allow the remote participant 106 to raise the arm as a means for gaining attention, or otherwise making a gesture (e.g., pointing at another participant, or at a whiteboard).

The robotic unit 110 may be movable. For example, the robotic unit 110 may be mounted on wheels or other means for allowing motion of the unit. In this case, for example, the robotic unit 110 may be (e.g., locally or remotely) moved to the front of a room to give a presentation.

Alternatively, the robotic unit 110 may take entirely different forms than those described herein. For example, the robotic unit may take more of a humanoid or semi-humanoid form. In this case, for example, such a robotic unit may have two extendable and movable arms, and may have associated cameras positioned as eyes, or other features associated with a human face. In this way, even more physical gesture information may be conveyed using the robotic unit 110 than is explicitly described herein.

A number of implementations have been described. Nevertheless, it will be understood that various modifications may be made. Accordingly, other implementations are within the scope of the following claims.

What is claimed is:

1. A system comprising:
   an audio-visual input system at a first location that is operable to receive audio-visual information associated with a user;
   a gesture determination system at the first location that is operable to determine gesture information associated with a state of mind of the user based on the received audio-visual information associated with the user; and
   a tele-embodiment unit at a second location that is operable to receive the gesture information and automatically engage in movement corresponding to the gesture information, whereby the movement of the tele-embodiment unit expresses the state of mind of the user.

2. The system of claim 1 wherein the second location is a site of a conference, and the tele-embodiment unit conveys a physical presence of the user.

3. The system of claim 1 comprising an audio-visual output system at the second location that is operable to output the audio-visual information associated with the user.

4. The system of claim 1 wherein the tele-embodiment unit includes a robotic arm associated with a monitor and camera.

5. The system of claim 4 wherein the tele-embodiment unit is operable to move the monitor and camera in alignment with one another.

6. The system of claim 1 wherein the gesture determination system includes a gesture control device by which the user inputs the gesture information.

7. The system of claim 6 wherein the gesture information includes selectable emotional states and the movement of the tele-embodiment unit is pre-programmed to correspond to a selected emotional state.

8. The system of claim 1 wherein the gesture determination system includes a gesture control device that is operable to track physical movements of the user.

9. The system of claim 8 wherein the gesture determination system includes a gesture interpreter for associating the physical movements with the state of mind of the user.

10. A method comprising:
receiving audio-visual input from a conference participant;
determining expression information associated with a non-verbal communication of the conference participant based on the received audio-visual input from the conference participant;
transmitting the audio-visual input and the expression information to a conference location;
rendering the audio-visual input at an audio-visual output associated with a tele-embodiment unit at the conference location; and
moving the tele-embodiment unit automatically, based on the expression information, to reflect the non-verbal communication of the conference participant.

11. The method of claim 10 wherein determining expression information comprises receiving a selection of expression information from among a pre-selected list available to the conference participant.

12. The method of claim 10 wherein determining expression information comprises:
tracking physical movements of the conference participant; and
running a software analysis process to determine the non-verbal communication, based on the physical movements.

13. The method of claim 10 wherein moving the tele-embodiment unit comprises moving a video screen that is attached to a robot arm so as to be pivotable and movable in three dimensions.

14. The method of claim 10 wherein the tele-embodiment unit has a one-to-one correspondence with the conference participant, such that a physical presence of the conference participant is conveyed at the conference location.

15. A video-conferencing system comprising:
a plurality of participant input systems corresponding to a plurality of participants, each input system operable to receive audio-visual input from its corresponding participant; and
a plurality of physical conference units located at a conference location that is remote from a location of each of the participant input systems, each of the physical conference units corresponding to one of the plurality of participants and including audio-visual output capabilities,
wherein the physical conference units convey a physical presence of their corresponding participants at the conference location based on the received audio-visual inputs from their corresponding participants.

16. The video-conferencing system of claim 15 wherein each participant input system comprises:
a gesture determination system operable to receive gesture information associated with a state of mind of its corresponding participant based on the received audio-visual input from its corresponding participant; and
a remote communication handler operable to forward the gesture information and the audio-visual input to its corresponding physical conference unit.

17. The video-conferencing system of claim 16 wherein the gesture determination system comprises:
a gesture control device operable to track physical movements of its corresponding participant; and
a gesture interpreter operable to associate the physical movements with the state of mind.

18. The video-conferencing system of claim 16 wherein each physical conference unit comprises a robotic unit operable to automatically move in coordination with the gesture information, such that the physical conference unit physically expresses the state of mind of its corresponding participant.

19. The video-conferencing system of claim 18 wherein the robotic unit comprises a video screen aligned with a camera and attached to a robot arm that is operable to move the video screen and camera in conjunction with the gesture information and the audio-visual input.

20. The video-conferencing system of claim 19 wherein the robot arm is operable to move the video screen and camera in three dimensions.

21. The system of claim 6 wherein the gesture information includes selectable states of mind and the movement of the tele-embodiment unit is pre-programmed to correspond to a selected state of mind.

* * * * *